US012592622B2

(12) United States Patent
Vannest et al.

(10) Patent No.: US 12,592,622 B2
(45) Date of Patent: Mar. 31, 2026

(54) TRANSVERSE FLUX ASYNCHRONOUS ELECTRIC MACHINE

(71) Applicant: The Boeing Company, Arlington, VA (US)

(72) Inventors: Jeremiah Vannest, Columbus, OH (US); Shengyi Liu, Sammamish, WA (US)

(73) Assignee: The Boeing Company, Arlington, VA (US)

(*) Notice: Subject to any disclaimer, the term of this patent is extended or adjusted under 35 U.S.C. 154(b) by 206 days.

(21) Appl. No.: 18/452,116

(22) Filed: Aug. 18, 2023

(65) Prior Publication Data

US 2025/0062667 A1 Feb. 20, 2025

(51) Int. Cl.
*H02K 17/12* (2006.01)
*B64D 27/35* (2024.01)
(Continued)

(52) U.S. Cl.
CPC ............. *H02K 17/12* (2013.01); *B64D 27/35* (2024.01); *H02K 1/16* (2013.01); *H02K 1/24* (2013.01);
(Continued)

(58) Field of Classification Search
CPC . B64D 27/35; H02K 1/16; H02K 1/24; H02K 11/33; H02K 17/12; H02K 17/44;
(Continued)

(56) References Cited

U.S. PATENT DOCUMENTS 4,385,251 A * 5/1983 Mallick .................. H02K 19/20
                                                    322/48
7,732,966 B2 * 6/2010 Sivasubramaniam ......................
                                                    H02K 55/06
                                                    310/178
(Continued)

FOREIGN PATENT DOCUMENTS

CN          104113150 A     10/2014
CN          106655546 A      5/2017
(Continued)

OTHER PUBLICATIONS

Translation of Foreign Patent Document No. CN 104113150 A (Year: 2014).*
(Continued)

*Primary Examiner* — Alex W Mok
(74) *Attorney, Agent, or Firm* — Alleman Hall LLP

(57) ABSTRACT

Examples are disclosed that relate to an electric machine that achieves independent speed, variable frequency power generation and has increased power density, efficiency, reliability, and reduced complexity relative to conventional electric machines. In one example, an electric machine includes a stator, a first stationary winding coupled to the stator, a second stationary winding coupled to the stator, and a rotor. The second stationary winding includes a plurality of winding segments corresponding to a number of phases of power of the electric machine. The rotor extends through the stator and the second stationary winding. The rotor includes a plurality of rotor segments. Each rotor segment of the plurality of rotor segments includes a plurality of pole lobes that extend radially from the rotor segment. Two or more pole lobes of each rotor segment are located on opposing sides of a corresponding winding segment of the second stationary winding.

20 Claims, 8 Drawing Sheets

(51) Int. Cl.

| | | |
|---|---|---|
| *H02K 1/16* | (2006.01) | |
| *H02K 1/24* | (2006.01) | |
| *H02K 11/33* | (2016.01) | |

(52) U.S. Cl.
CPC ......... *H02K 11/33* (2016.01); *H02K 2201/06* (2013.01)

(58) Field of Classification Search
CPC ............. H02K 21/029; H02K 2201/06; H02K 2201/12
USPC ........................................................ 310/166
See application file for complete search history.

(56) References Cited

U.S. PATENT DOCUMENTS

| | | | | |
|---|---|---|---|---|
| 9,917,544 | B2 | 3/2018 | Buffenbarger et al. | |
| 10,063,119 | B2 * | 8/2018 | Guina | H02K 3/28 |
| 10,340,756 | B2 * | 7/2019 | Saito | H02K 1/276 |
| 10,868,461 | B2 * | 12/2020 | Patel | H02K 1/27 |
| 11,011,966 | B2 * | 5/2021 | Latulipe | H02K 16/02 |
| 2004/0239201 | A1 * | 12/2004 | Sivasubramaniam | H02K 55/04 |
| | | | | 310/261.1 |
| 2012/0286516 | A1 | 11/2012 | Chong et al. | |
| 2015/0102606 | A1 | 4/2015 | Shah et al. | |
| 2018/0198332 | A1 | 7/2018 | Ueda et al. | |

| | | | | |
|---|---|---|---|---|
| 2019/0158002 | A1 | 5/2019 | Gao et al. | |
| 2021/0099117 | A1 | 4/2021 | Gao et al. | |
| 2022/0320945 | A1 | 10/2022 | Yazaki et al. | |

FOREIGN PATENT DOCUMENTS

| | | | | |
|---|---|---|---|---|
| EP | 2523318 | A2 | 11/2012 | |
| EP | 4510431 | A1 * | 2/2025 | ............... H02K 1/24 |
| JP | H01170352 | A | 7/1989 | |
| RU | 107418 | U1 | 8/2011 | |

OTHER PUBLICATIONS

Berriel, R. et al., "Brushless Cascaded Doubly-Fed Induction Machine: Modeling and Simulation," Proceedings of 2017 Brazilian Power Electronics Conference, Nov. 19, 2017, Juiz de Fora, Brazil, 5 pages.

Griffo, A. et al., "Design and Characterization of a Three-Phase Brushless Exciter for Aircraft Starter/Generator," IEEE Transactions on Industry Applications, vol. 49, No. 5, Jun. 17, 2013, 10 pages.

Severson, E. et al., "Dual-Purpose No-Voltage Winding Design for the Bearingless AC Homopolar and Consequent Pole Motors," IEEE Transactions on Industry Applications, vol. 51, No. 4, Jan. 8, 2015, 12 pages.

European Patent Office, Extended European Search Report Issued in Application No. 24188102.8, Dec. 3, 2024, Germany, 8 pages.

European Patent Office, Extended European Search Report Issued in Application No. 24212010.3, Apr. 17, 2025, 6 pages.

* cited by examiner

TRANSVERSE FLUX ASYNCHRONOUS ELECTRIC MACHINE

FIELD

The present disclosure relates generally to the field of electric machines, and more specifically to power generators and electric motors.

BACKGROUND

Electric machines, such as electric generators or electric alternators, generate power for various applications. In aircraft applications, such electric machines are responsible for generating power to meet the aircraft's electric needs. More particularly, such electric machines are configured to generate alternating current (AC) power for various onboard systems and equipment, such as avionics equipment, lighting systems, environmental control systems (ECS), galley equipment, entertainment systems, and other electrical devices.

Conventional AC electric machines used in aircraft have various drawbacks. In one example, a conventional constant speed, constant frequency (CSCF) electric generator used in an aircraft requires a constant speed drive (CSD) to couple the CSCF electric generator with an engine of the aircraft. The CSD is a complex and heavy mechanical system having relatively high maintenance costs and relatively short service life.

In another example, a conventional variable speed, variable frequency (VSVF) electric generator can be coupled to an engine of an aircraft without a CSD. However, the conventional VSVF electric generator produces AC power with a wide range of frequencies that are dependent on the engine speed. This dependency causes the conventional VSVF electric generator to require separate conversion equipment, such as a full power AC/DC/AC converter to maintain the output frequency at a desired level for specific applications. The consequence is that the system becomes more complicated and adversely affects the system efficiency and reliability.

In yet another example, a conventional independent speed, variable frequency (ISVF) electric generator also can be coupled to an engine of an aircraft without a CSD. The conventional ISVF electric generator is capable of producing AC power having a constant frequency at varying engine speeds. However, the conventional ISVF electric generator typically includes power electronic components (e.g., rectifier, inverter) that are coupled to a rotor that rotates during operation conventional ISVF electric generator. The rotation of these power electronic components can lead to reliability issues. Moreover, the conventional ISVF electric generator requires wireless control of these power electronics due to their rotation that increases complexity and cost of the conventional ISVF electric generator.

SUMMARY

Examples are disclosed that relate to an electric machine that achieves independent speed, variable frequency power generation and has increased power density, efficiency, reliability, and reduced complexity relative to conventional approaches. In one disclosed example, an electric machine includes a stator, a first stationary winding coupled to the stator, a second stationary winding coupled to the stator, and a rotor. The second stationary winding includes a plurality of winding segments corresponding to a number of phases of power of the electric machine. The rotor extends through the stator and the second stationary winding. The rotor includes a plurality of rotor segments. Each rotor segment of the plurality of rotor segments includes a plurality of pole lobes that extend radially from the rotor segment. Two or more pole lobes of each rotor segment are located on opposing sides of a corresponding winding segment of the second stationary winding.

The features, functions, and advantages that have been discussed can be achieved independently in various embodiments or may be combined in yet other embodiments, further details of which can be seen with reference to the following description and drawings.

DETAILED DESCRIPTION

Figure 1:
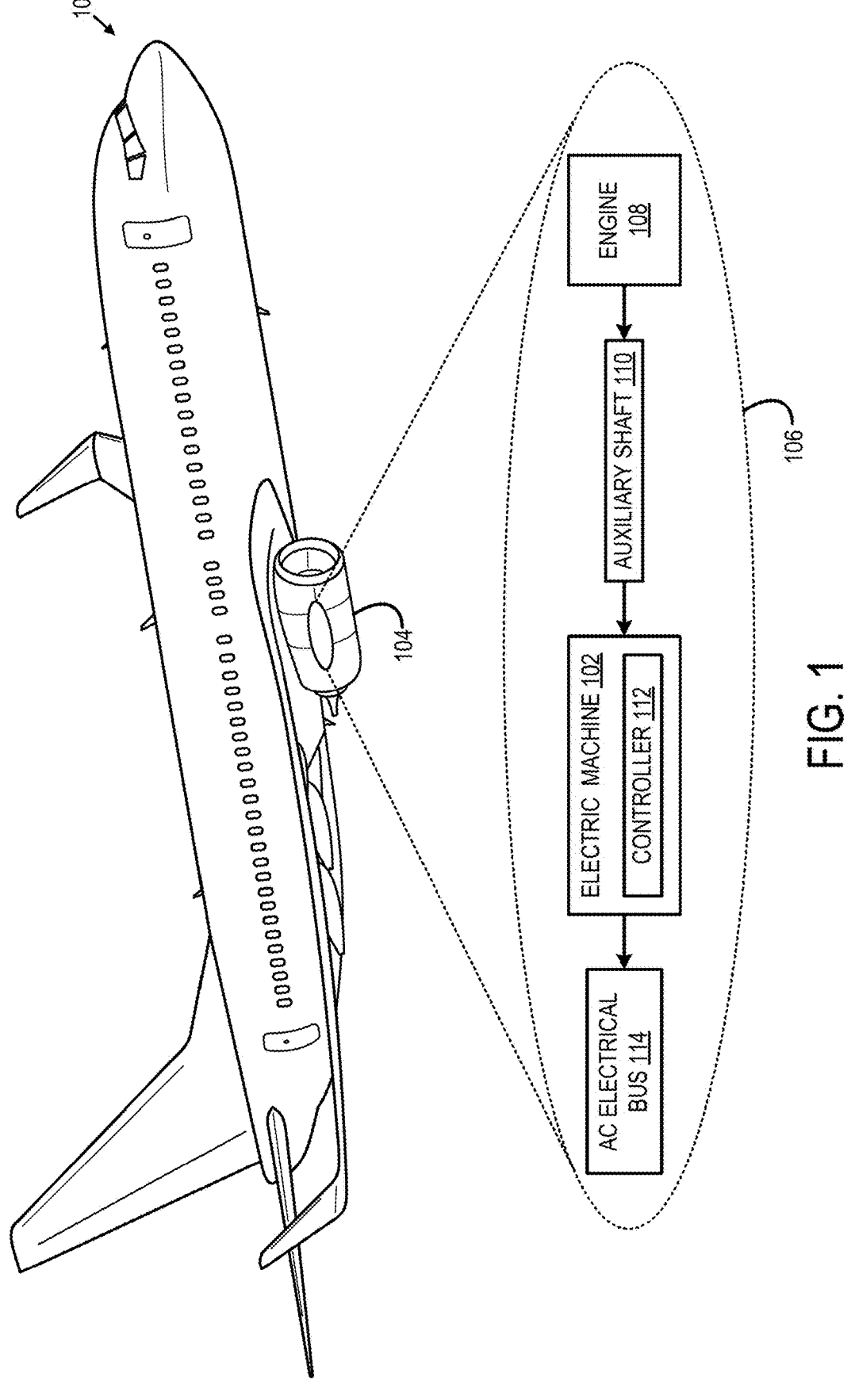
FIG. 1 schematically shows an example embodiment of an aircraft including an electric machine of the present disclosure.

Conventional AC electric machines used in aircraft have various drawbacks. In one example, a conventional constant speed, constant frequency (CSCF) electric generator used in an aircraft produces an output frequency that is dependent on the speed of the rotor of the conventional CSCF electric generator. The conventional CSCF electric generator requires a constant speed drive (CSD) to couple the rotor to an engine of the aircraft. The CSD translates variable engine speed to a constant rotor speed. The CSD is a complex and heavy mechanical system having relatively high maintenance costs and relatively short service life.

In another example, a conventional variable speed, variable frequency (VSVF) electric generator can produce varying output frequencies and voltages by adjusting the rotational speed of the generator. The conventional VSVF electric generator can be coupled to an engine of an aircraft without a CSD. However, the conventional VSVF electric generator requires separate conversion equipment, such as a full power AC/DC/AC converter to maintain the output frequency at a desired level for specific applications. The consequences are that the overall system becomes more complicated and adversely affects the system's efficiency and reliability.

In yet another example, a conventional independent speed, variable frequency (ISVF) electric generator produces variable frequency output while operating at a speed independent of the output frequency that allows for decoupling of the speed and the generated frequency. The conventional ISVF electric generator also can be coupled to an engine of an aircraft without a CSD. However, the conventional ISVF electric generator typically includes power electronic components (e.g., rectifier, inverter) that are coupled to a rotor that rotates during operation of the conventional ISVF electric generator. The rotation of these power electronic components can lead to reliability issues.

Moreover, the conventional ISVF electric generator requires wireless control of these power electronics due to their rotation that increases complexity and cost of the conventional ISVF electric generator.

Accordingly, the present description is directed to an electric machine having an architecture that allows the electric machine to achieve ISVF power generation while also having increased power density, efficiency, reliability, and reduced complexity relative to conventional electric machines. In one example, an electric machine includes a stator, a first stationary winding coupled to the stator, a second stationary winding coupled to the stator, and a rotor. The second stationary winding includes a plurality of winding segments corresponding to a number of phases of power of the electric machine. The rotor extends through the stator and the second stationary winding. The rotor includes a plurality of rotor segments. Each rotor segment of the plurality of rotor segments includes a plurality of pole lobes that extend radially from the rotor segment. Two or more pole lobes of each rotor segment are located on opposing sides of a corresponding winding segment of the second stationary winding.

The architecture of the electric machine enables a plurality of flux paths to be generated based on an AC excitation current being applied to one of the stationary windings. Each flux path extends transversely across the rotor three-dimensionally in radial and axial directions relative to the electric machine. More particularly, each flux path travels through a pair of pole lobes of the same rotor segment of the rotor that are located on opposing sides of a corresponding winding segment of the second stationary winding. The flux paths collectively enable the electric machine to generate power at a desired output frequency by adjusting the AC excitation current as the rotor speed changes. In this way, the output frequency is decoupled from the rotor speed, which is also referred to as being independent speed, variable frequency.

Moreover, achieving independent speed, variable frequency in this manner allows the rotor of the electric machine to be directly connected to a shaft of an engine of an aircraft without requiring a CSD, which increases the reliability, power density, and efficiency of the power generation system of the aircraft, while also reducing the cost, weight, and complexity of the power generation system of the aircraft relative to a conventional electric machine that requires a CSD.

Furthermore, since the first and second windings are stationary in the electric machine, the likelihood of the windings becoming degraded during operation of the electric machine is reduced relative to a conventional electric machine that includes rotating electronic components located on a rotor. This increases the reliability of the electric machine relative to a conventional electric machine that includes rotating electronic components located on a rotor. Also, since the first and second windings are stationary in the electric machine, the electrical connections for these windings are less complex relative to electrical connections (e.g., brushes) of a conventional electric machine that includes rotating electronic components located on a rotor.

FIG. 1 schematically shows an example embodiment of an aircraft 100 including an electric machine 102 of the present disclosure. The aircraft 100 includes an engine compartment 104. Note that FIG. 1 depicts an imaginary cutout 106 that schematically shows relevant components within the engine compartment 104 for purposes of discussion. The cutout 106 does not exist in the actual engine compartment 104.

The aircraft 100 includes an engine 108 within the engine compartment 104. In one example, the engine 108 is a gas turbine/jet engine that is configured to provide power to propel the aircraft 100. More particularly, the jet engine operates on the principle of compressing incoming air, mixing it with fuel, combusting the mixture, and then expanding and accelerating the exhaust gases to create thrust to overcome drag and propel the aircraft 100 through the air during flight. In other embodiments, the engine 108 may take another form, such as a piston engine or a turboprop engine. The engine 108 may take any suitable form depending on the type of aircraft.

An auxiliary shaft 110 is driven by the engine 108 to provide mechanical power to drive various accessories and systems of the aircraft 100. The auxiliary shaft 110 is coupled to the electric machine 102. More particularly, the auxiliary shaft 110 is coupled to a rotor 206 (shown in FIG. 2) of the electric machine 102, such that rotation of the auxiliary shaft 110 causes rotation of the rotor 206. The speed of the auxiliary shaft 110 varies with the speed of the engine 108.

The electric machine 102 is configured to convert the mechanical power generated by rotation of the auxiliary shaft 110 into alternating current (AC) power having an output frequency that is independent of the speed at which the auxiliary shaft 110 rotates. In other words, the electric machine 102 operates as an ISVF electric generator that allows for decoupling of the rotation speed and the output frequency of the generated AC power. Note that the independent speed, variable frequency operation of the electric machine 102 allows for the rotor 206 to couple directly to the auxiliary shaft 110 without requiring use of a CSD.

The electric machine 102 includes a controller 112 that is configured to apply an AC excitation current to a stationary winding of the electric machine 102 based on the speed of the rotor 206 to adjust the output frequency of the AC output power generated by the electric machine 102 to a desired output frequency that is independent of the rotation speed of the rotor 206. More particularly, the controller 112 can control the output frequency of the AC output power by adjusting the frequency of the AC excitation current. The controller 112 may be configured to adjust the frequency of the AC excitation current based on the speed of the rotor 206 to produce any suitable output frequency of the AC output power. Typically, the desired output frequency is a constant frequency, although the controller 112 may vary the output frequency under some conditions, in some examples. Further, the controller 112 is configured to adjust a magnitude of the AC excitation current to control the output voltage and power generated by the electric machine 102 and delivered to a system load. The controller 112 may be configured to adjust the magnitude of the AC excitation current to produce any suitable output voltage and power to meet any suitable system load.

The electric machine 102 is configured to output the AC output power to an AC electrical bus 114. The AC electrical bus 114 is configured to supply the AC power to a wide range of AC loads and systems on the aircraft 100. These can include avionics equipment, lighting systems, environmental control systems (ECS), galley equipment, entertainment systems, and other electrical devices.

In the illustrated embodiment, the electric machine 102 is configured to operate as an ISVF generator that provides AC power to various AC loads and systems in an aircraft. In other embodiments, the electric machine 102 may be configured to generate AC power in other types of vehicles (e.g., automobiles, spacecraft, watercraft, submersible vehicles, etc.). In still other embodiments, the electric machine 102 may be employed in stationary applications. In some embodiments, the electric machine 102 may be configured to provide AC power to a propulsion engine of an aircraft or another type of vehicle. In such embodiments, the electric machine is configured to operate as an electric motor.

Figure 2:
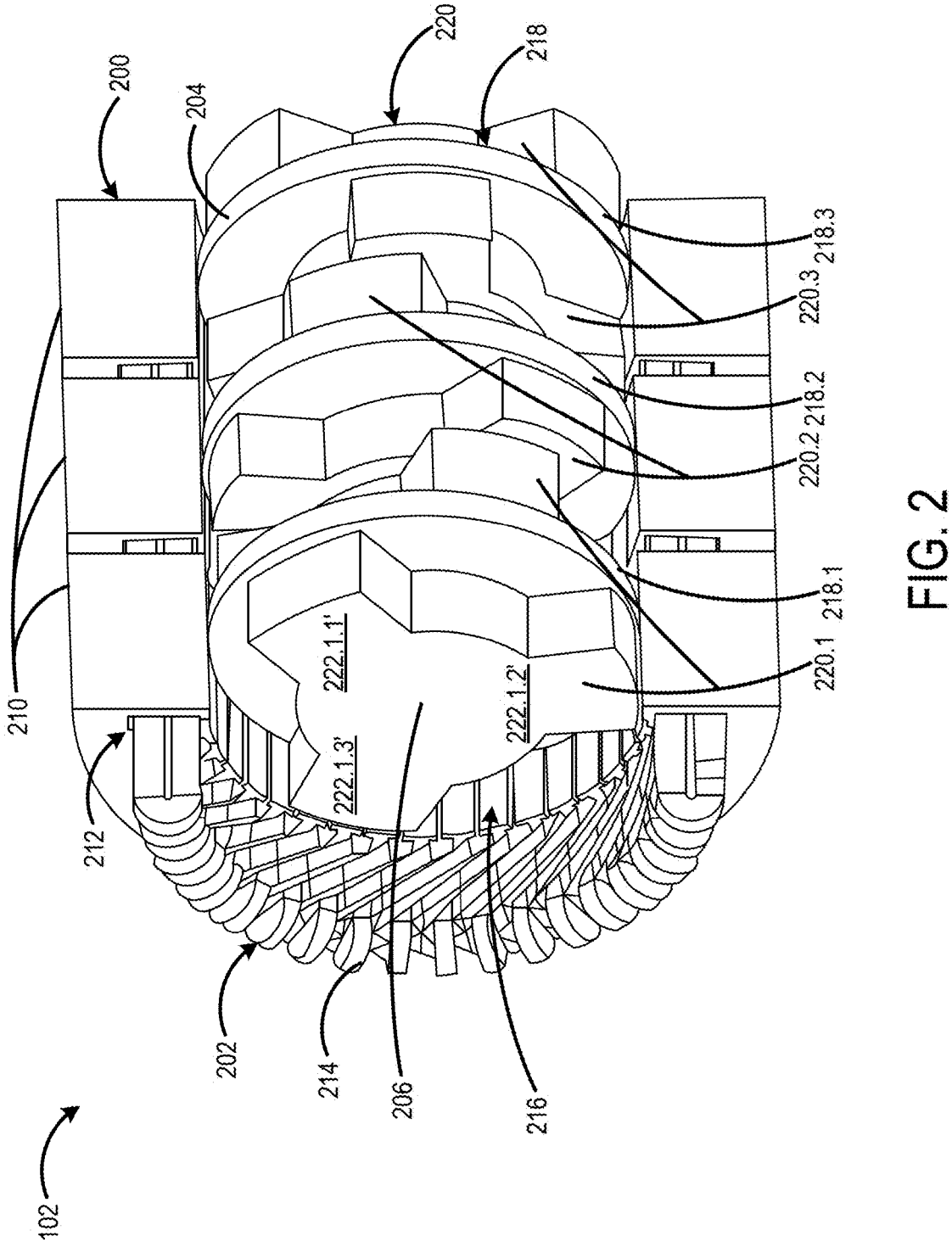
FIG. 2 shows a cutout view of the electric machine of FIG. 1.

FIG. 2 shows a cutout view of the electric machine 102 of FIG. 1 schematically depicting relevant components. In the illustrated embodiment, the electric machine 102 is configured to generate three-phase AC power and includes various features to support the generation of the three distinct alternating currents that are present in such three-phase AC power. Note that in other embodiments the electric machine 102 may be configured to generate AC power having a different number of phases (e.g., single phase, six phase, etc.) and the electric machine may include various features to support the generation of AC power corresponding to that number of phases.

The electric machine 102 includes a stator 200, a first stationary winding 202, a second stationary winding 204, and a rotor 206. The stator 200 is configured to provide mechanical support and stability to the electric machine 102, and more particularly to maintain its position relative to the rotor 206. The stator 200 is configured to house the first stationary winding 202. In the illustrated embodiment, the stator 200 includes a plurality of laminated cores 210. A plurality of slots 212 are formed in the plurality of laminated cores 210 of the stator 200.

The first stationary winding 202 includes a plurality of winding conductors 214 that are arranged in the stator 200 in a specific pattern, e.g., a three-phase configuration, to generate a magnetic field when energized with an alternating current. More particularly, the winding conductors 214 of the first stationary winding 202 are arranged in the plurality of slots 212 formed in the stator 200 and wrapped around the plurality of laminated cores 210.

The stator 200 forms a cylindrical cavity 216 and the second stationary winding 204 is coupled within the cylindrical cavity 216. In one example, the second stationary winding 204 is mounted along the inner diameter of the stator 200 along the cylindrical cavity 216. The second stationary winding 204 includes a plurality of winding segments 218 corresponding to a number of phases of power of the electric machine 102. In the illustrated embodiment, the second stationary winding 204 includes three winding segments 218.1, 218.2, and 218.3 corresponding to the three-phase AC power generated by the electric machine 102. The second stationary winding 204 may include any suitable number of segments that are used to generate any suitable number of phases of AC power. The winding segments 218 are distributed axially along the cylindrical cavity 216. Note that the winding segments 218 are stationary within the cylindrical cavity 216 and do not move with the rotor 206.

The rotor 206 extends axially through the cylindrical cavity 216 within the stator 200. The rotor 206 includes a plurality of rotor segments 220 corresponding to the number of phases of AC power generated by the electric machine 102. In the illustrated embodiment, the rotor 206 includes three rotor segments 220.1, 220.2, and 220.3 corresponding to the three phases of AC power generated by the electric machine 102. The rotor 206 may include any suitable number of rotor segments that are used to generate any suitable number of phases of AC power. The rotor segments 220 are distributed axially along the cylindrical cavity 216. Further, the rotor 206 extends through the second stationary winding 204. In particular, each of the plurality of winding segments 218 include a central aperture through which a corresponding rotor segment 220 extends, such that each rotor segment 220 is arranged on opposing sides of a corresponding winding segment 218.

Each rotor segment 220 includes a plurality of pole lobes 222 that extend radially from the rotor segment 220. More particularly, each rotor segment 220 has two sets of pole lobes arranged on opposing sides of a corresponding winding segment 218. In other words, each rotor segment 220 has two portions, one on each side of the corresponding winding segment 218. Pole lobes in the first set on one side of the rotor segment 220 are indicated by ('). Pole lobes in the second set on the other side of the rotor segment 220 are indicated by ("). For example, rotor segment 220.1 includes a first set of pole lobes 222.1.1', 222.1.2', and 222.1.3' and a second set of pole lobes 222.1.1", 222.1.2", and 222.1.3". The first set of pole lobes 222' and the second set of pole lobes 222" are arranged on opposing sides of the winding segment 218.1. Each rotor segment 220 of the rotor 206 may include two or more pole lobes 222 located on opposing sides of a corresponding winding segment 218 of the second stationary winding 204. The number of pole lobes 222 on opposing sides of a corresponding winding segment 218 depends on the number of phases of power generated by the electric machine 102.

As discussed above, with reference to FIG. 1, the controller 112 is configured to adjust an AC excitation current based on the speed of the rotor 206 to produce a desired output frequency. The controller 112 may be configured to apply the AC excitation current to either of the first stationary winding 202 or the second stationary winding 204 depending on the embodiment. The AC output power is generated on the other stationary winding. In the illustrated embodiment, the controller 112 applies the AC excitation current to the second stationary winding 204 and the AC output power is generated on the first stationary winding 202.

Figure 3:
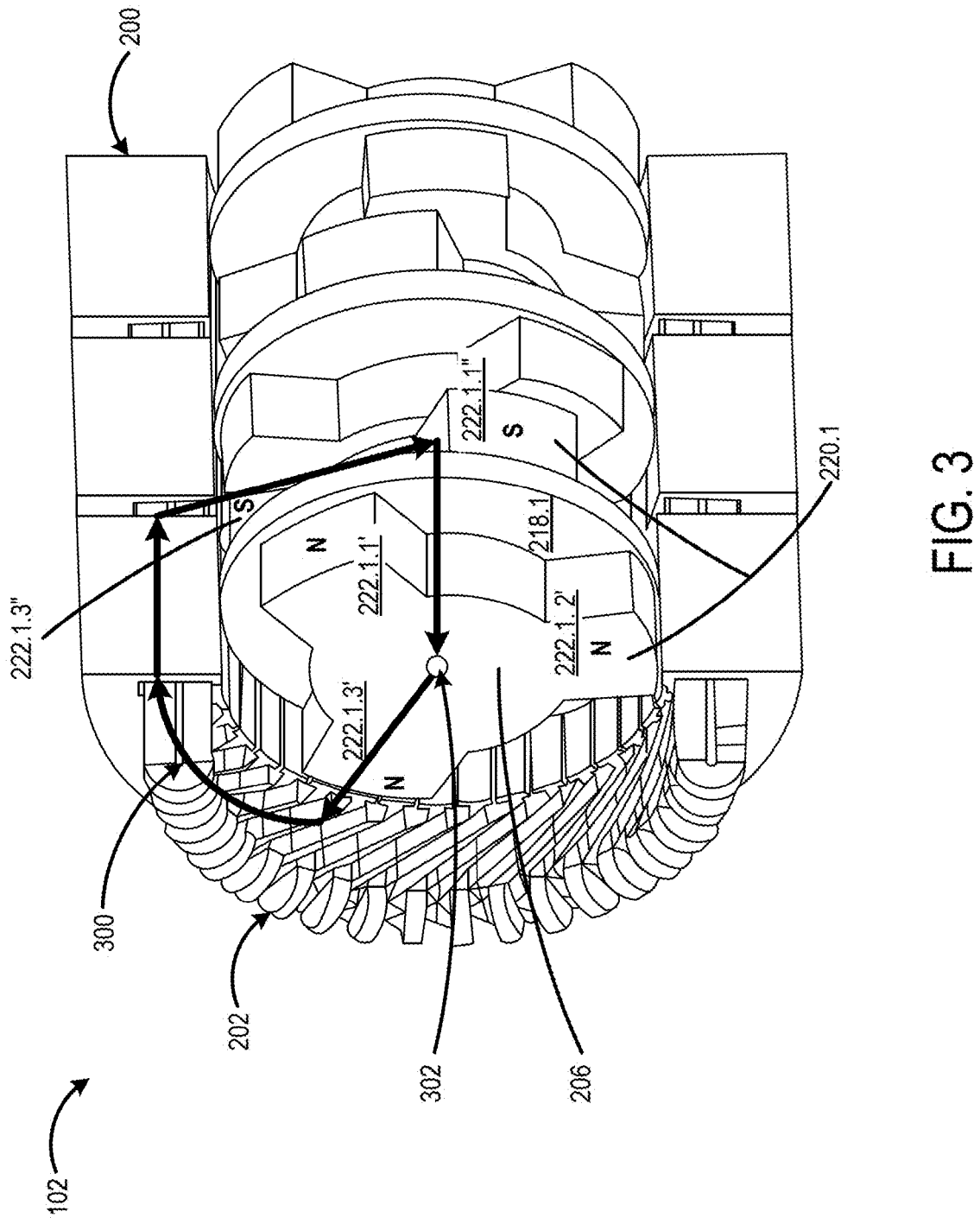
FIG. 3 shows a cutout view of the electric machine of FIG. 1 including a direction of a flux path generated by the electric machine.

When the second stationary winding 204 is energized with the AC excitation current, a magnetic field is produced. FIG. 3 shows an example flux path 300 of the magnetic field generated by electric machine 102. The flux path 300 starts at an origin point 302 at the center of the first rotor segment 220.1 of the rotor 206. The flux path 300 extends transversely across the first rotor segment 220.1 radially along the pole lobe 222.1.3' toward the first stationary winding 202. The flux path 300 continues to travel radially along the first stationary winding 202 and the stator 200. Then, the flux path 300 travels axially across the first winding segment 218.1 of the second stationary winding 204 to the opposing side of the first rotor segment 220.1. The flux path 300 extends transversely across the first rotor segment 220.1 and radially along the pole lobe 222.1.3" back to the center of the first rotor segment 220.1. Finally, the flux path travels axially back across the first winding segment 218.1 and through the first rotor segment 220.1 back to the origin point 302 to complete the flux path 300. The flux path 300 travels in radial and axial directions in three dimensions through the electric machine 102.

The flux path 300 travels through the pair of pole lobes 222.1.3' and 222.1.3" on opposing sides of the first winding segment 218.1 The electric machine 102 generates similar flux paths through each pair of opposing pole lobes on each rotor segment of the plurality of the rotor segments 220. For example, a second flux path (not shown) travels through the pair of pole lobes 222.1.1' and 222.1.1". Likewise, a third flux path (not shown) travels through the pair of pole lobes 222.1.2' and 222.1.2" (shown in FIG. 4). The flow of the AC excitation current constantly changes direction in a cyclic manner to produce a waveform that alternates between positive and negative half-cycles as the current changes direction. This cyclic change in direction causes the poles of the pole lobes 222' and 222" to flip back and forth. In the illustrated example, at this moment, the pole lobes 222.1', 222.2', and 222.3' are North poles and the pole lobes 222.1.1", 222.1.2", and 222.1.3" are South poles. As the flow of the AC excitation current changes direction, the poles switch such that the pole lobes 222.1.1', 222.1.2', and 222.3' are South poles and the pole lobes 222.1.1", 222.1.2", and 222.1.3" are North poles until the AC excitation current changes direction again, and so on according to the cycles of the waveform. Similarly, triplets of flux paths are generated for each of the other rotor segments 220 of the electric machine 102.

The plurality of flux paths are generated by the interaction between the rotor 206 and the first and second stationary windings 202 and 204 as the rotor 206 rotates within the stator 200 of the electric machine 102. The plurality of flux paths collectively generate three-phase AC output power at the desired frequency on the first stationary winding 202 based on the AC excitation current being applied to the second stationary winding 204 through the process of electromagnetic induction. The three-phase AC output power having the desired frequency is output from the first stationary winding 202 to the AC bus 114 (shown in FIG. 1) or another suitable load of the aircraft 100 (shown in FIG. 1).

The frequency relationship between the rotor speed and the first and second windings is as follows:

$$f_1 = f_{re} + f_2$$

$$f_{re} = \frac{pn}{120}$$

$f_1$: the frequency of the first stationary winding
$f_2$: the frequency of the secondary stationary winding
$f_{re}$: the electrical frequency of the rotor
p: the number of poles of the electric machine
n: the rotor speed in rpm Using the equations above, if f1 is chosen to be the desired frequency, then f2 can be adjusted as the rotor speed changes to maintain constant frequency output at the desired frequency.

Figure 4:
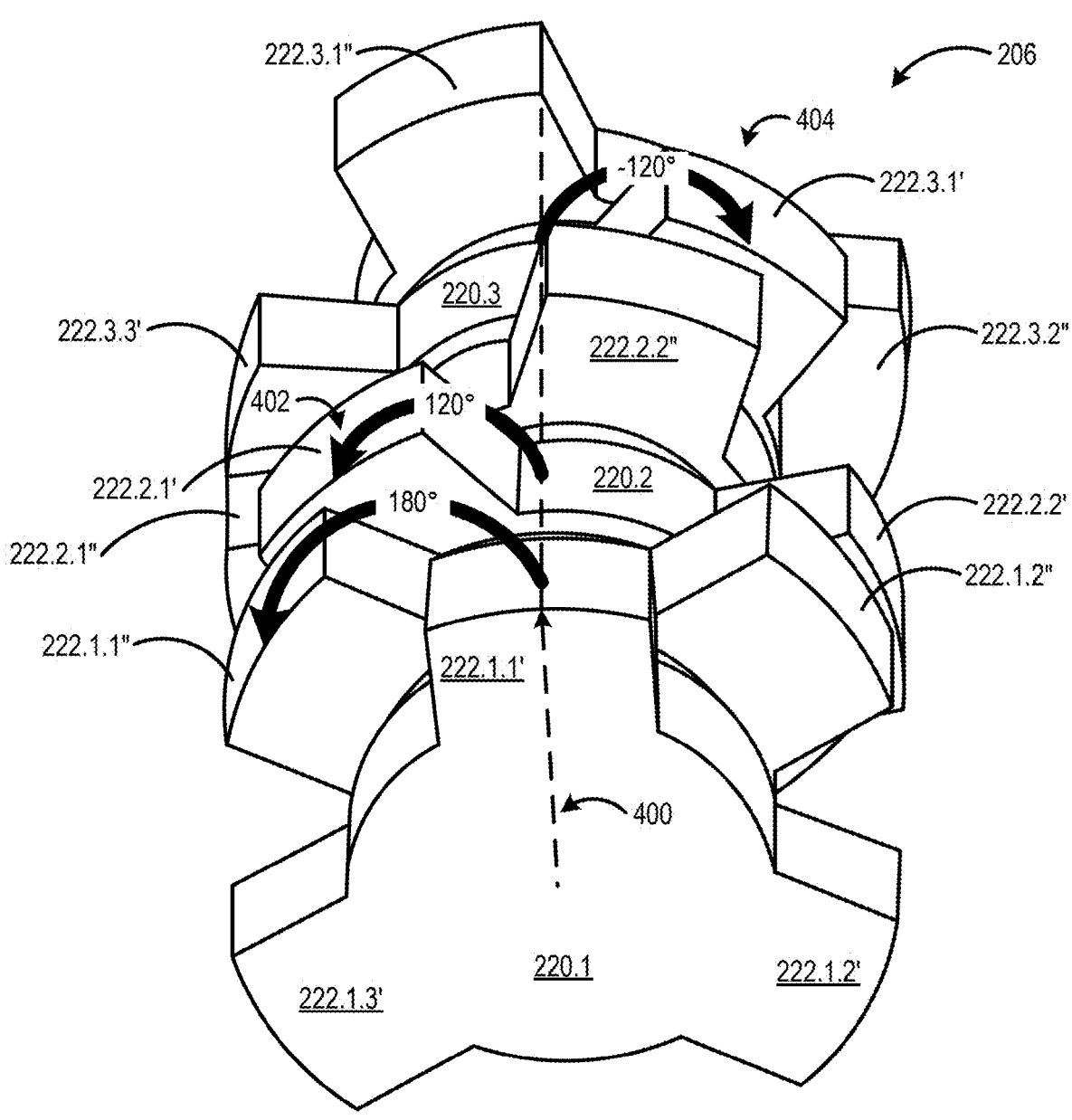
FIG. 4-5 show different views highlighting different aspects of a rotor of the electric machine of FIG. 1.
Figure 5:
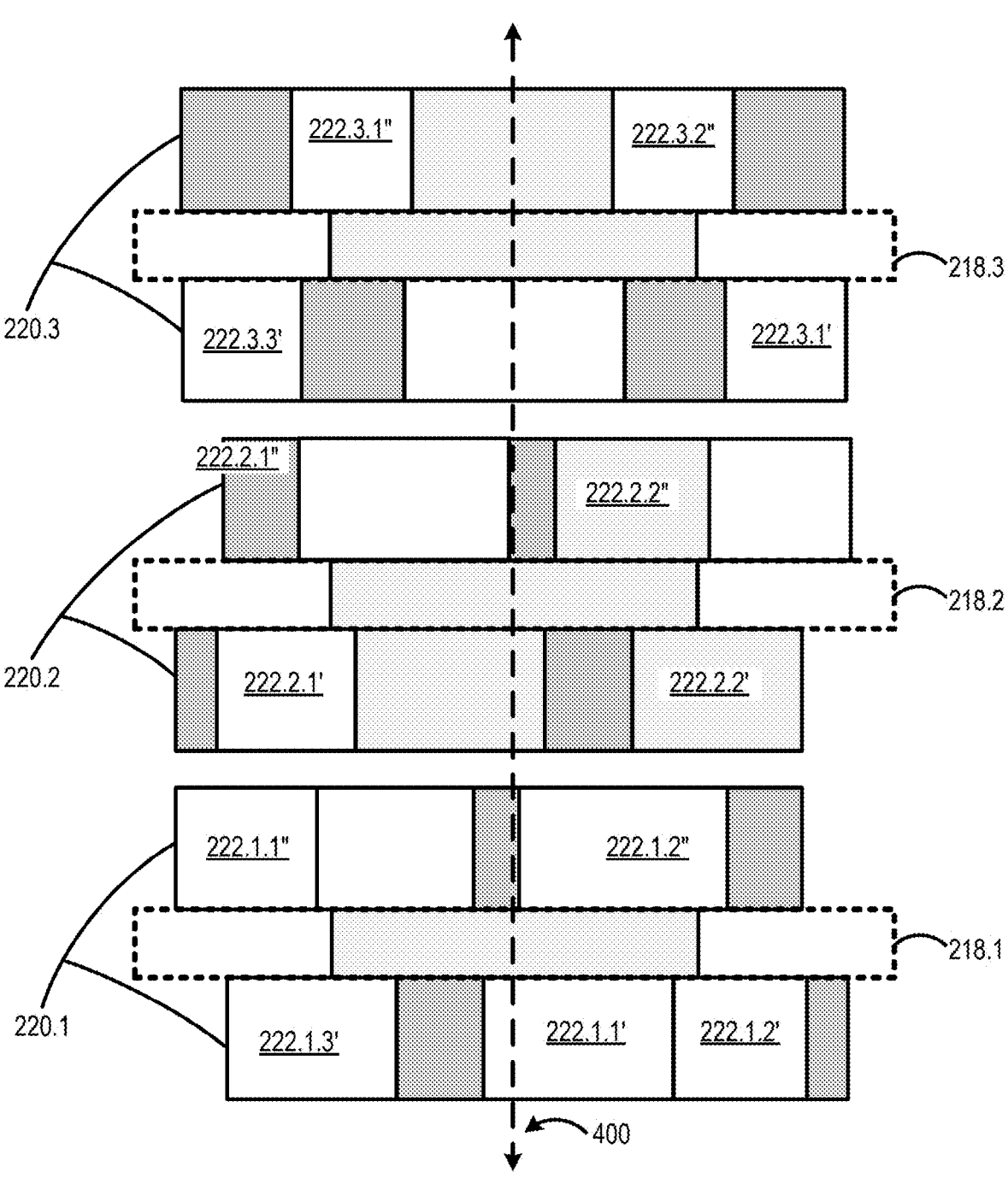

The arrangement of the sets of pole lobes 222' and 222" on the different rotor segments 220 allows for the three-phase AC excitation current to provide constant torque output during operation of the electric machine 102. FIGS. 4-5 show different views highlighting different aspects of the rotor 206 of the electric machine 102. FIG. 4 shows an angled front view of the rotor 206 with the second stationary winding 204 omitted for purposes of clarity. FIG. 5 shows a top view of the rotor 206 divided into the plurality of rotor segments 220.1, 220.2, and 220.3. Placement of the winding segments 218.1, 218.2, and 218.3 of the second stationary winding 204 are shown in dotted lines on the plurality of rotor segments 220.1, 220.2, and 220.3.

The arrangement of the pole lobes on the different rotor segments of the rotor 206 is based on the number of phases of the AC output power generated by the electric machine 102. More particularly, different sets of pole lobes 222 on the same rotor segment 220 are offset by a number of degrees of electrical angle. Further, different sets of pole lobes 222 on different rotor segments 220 are offset by a number of degrees of electrical angle. The equation to relate electrical angle to the mechanical angle is as follows:

$$\theta_e = \frac{P}{2}\theta_m$$

$\theta_e$: the electrical angle of the rotor
$\theta_m$: the mechanical angle of the rotor
P: the number of pole lobes of the electric machine In the illustrated embodiment, the arrangement of the pole lobes 222 on the different rotor segments 222 is configured to generate three-phase power. As such, the rotor 206 includes three rotor segments 220.1, 220.2, and 220.3. Each rotor segment includes two sets of pole lobes 222' and 222". Each set of pole lobes 222 includes three pole lobes per set. In particular, the first rotor segment 220.1 includes the first set of pole lobes 222.1.1', 222.1.2' and 222.1.3' that are each offset one hundred twenty electrical degrees relative to each other. The first rotor segment 220.1 further includes the second set of pole lobes 222.1.1", 222.1.2" and 222.1.3" that are each offset one hundred twenty electrical degrees relative to each other. Additionally, the first set of pole lobes 222.1.1', 222.1.2' and 222.1.3' is rotated one hundred eighty electrical degrees relative to the second set of pole lobes 222.1.1', 222.1.2' and 222.1.3' on the first rotor segment 220.1. This arrangement causes each pole lobe in one set to align with a gap between pole lobes of the opposing set on the rotor segment.

The second rotor segment 220.2 includes a first set of pole lobes 222.2.1', 222.2.2' and 222.2.3' that are each offset one hundred twenty electrical degrees relative to each other. The second rotor segment 220.2 further includes a second set of pole lobes 222.2.1", 222.2.2" and 222.2.3" that are each offset one hundred twenty electrical degrees relative to each other. Additionally, the first set of pole lobes 222.2.1', 222.2.2' and 222.2.3' is rotated one hundred eighty electrical degrees relative to the second set of pole lobes 222.2.1', 222.2.2' and 222.2.3' on the second rotor segment 220.2. This arrangement causes each pole lobe in one set to align with a gap between pole lobes of the opposing set on the rotor segment.

The third rotor segment 220.3 includes a first set of pole lobes 222.3.1', 222.3.2' and 222.3.3' that are each offset one hundred twenty electrical degrees relative to each other. The third rotor segment 220.3 further includes a third set of pole lobes 222.3.1", 222.3.2" and 222.3.3" that are each offset one hundred twenty electrical degrees relative to each other. Additionally, the first set of pole lobes 222.3.1', 222.3.2' and 222.3.3' is rotated one hundred eighty electrical degrees relative to the second set of pole lobes 222.3.1', 222.3.2' and 222.3.3' on the third rotor segment 220.3. This arrangement causes each pole lobe in one set to align with a gap between pole lobes of the opposing set on the rotor segment.

According to the arrangement of the pole lobes on the rotor 206, each rotor segment 220 has a reference angle (e.g., an origin angle or 0° angle) that is offset from corresponding reference angles of each of the other rotor segments of the plurality of rotor segments by an offset angle that is based on the number of phases of the electric machine and a number of pole lobes on each rotor segment. For example, as shown in FIG. 4, the first rotor segment 220.1 has a first reference angle 400 that is centered on the first pole lobe 222.1.1' of the first set on the first rotor segment 220.1. Further, a second reference angle 402 that is centered on the first pole lobe 222.2.1' of the first set on the second rotor segment

220.2 is offset by a positive one hundred twenty degrees relative to the first reference angle 400. Further, a third reference angle 404 that is centered on the first pole lobe 222.3.1' of the first set on the third rotor segment 220.3 is offset by a negative one hundred twenty degrees relative to the first reference angle 400.

Furthermore, each rotor segment 220 includes three pairs of pole lobes on opposing sides of a corresponding winding segment of the second stationary winding 204. Each pole lobe of the pair is offset by one hundred eighty degrees of electrical angle relative to the other pole lobe of the pair of pole lobes. For example, as shown in FIG. 4, the first pole lobe 222.1.1' in the first set on the first rotor segment 220.1 is centered on the first reference angle 400 (e.g., the origin angle or 0° angle) and the corresponding first pole lobe 222.1.1" in the second set on the first rotor segment 220.1 is offset by one hundred eight degrees of electrical angle from the first pole lobe 222.1.1'. Each of the other opposing pairs of pole lobes on the first rotor segment 220.1 have the same offset.

The offsets of the reference angles between rotor segments and the offsets between pairs of pole lobes across the different rotor segments form an arrangement on the rotor 206 that allows for the electric machine 102 to generate three-phase AC output power. In other embodiments, the arrangement of the rotor segments and the pole lobes on the rotor segments may differ based on the phase of AC output power generated by the electric machine 102.

Figure 6:
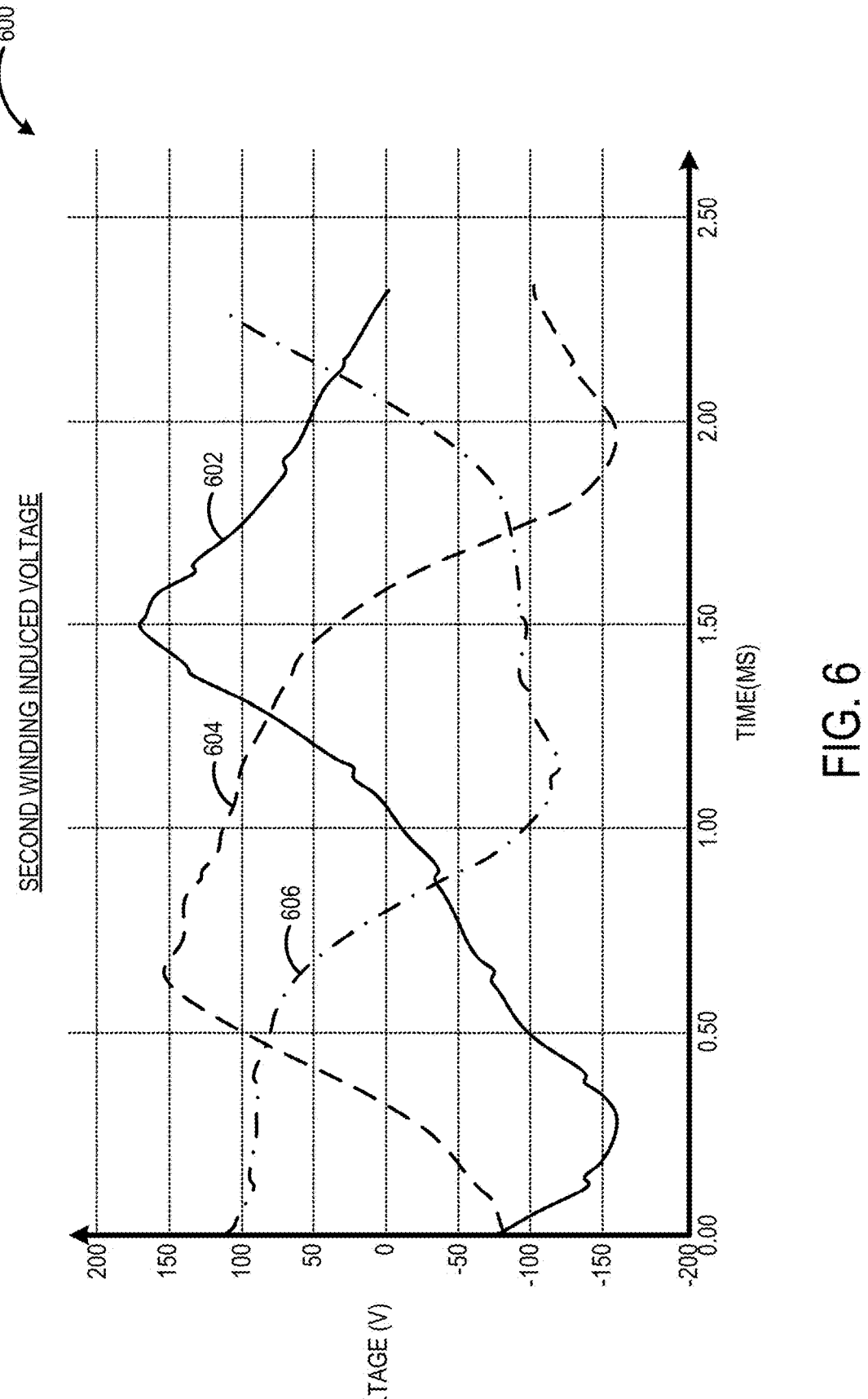
FIG. 6-8 shows graphs of different example waveforms generated during simulated operation of the electric machine of FIG. 1.
Figure 7:
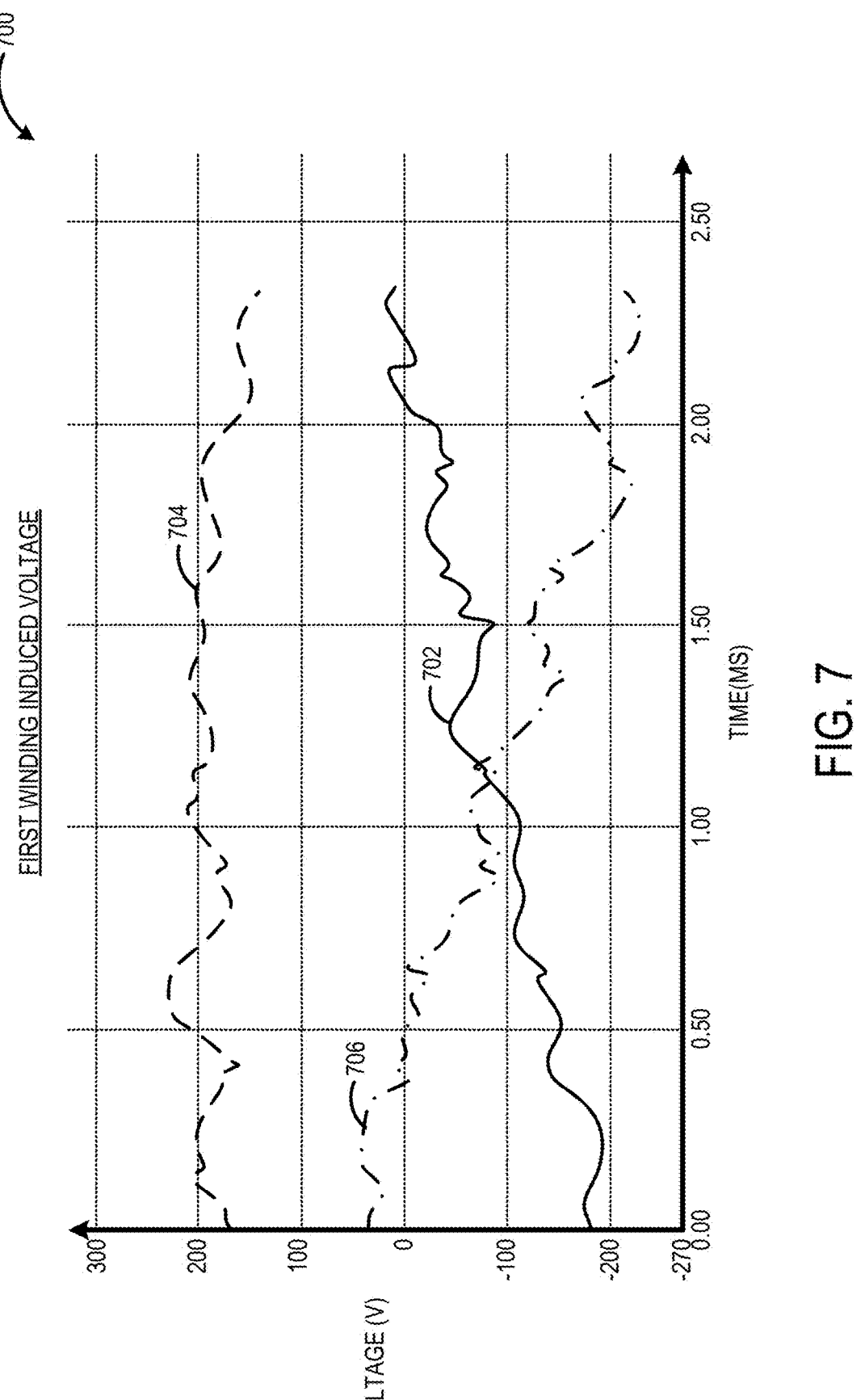
Figure 8:
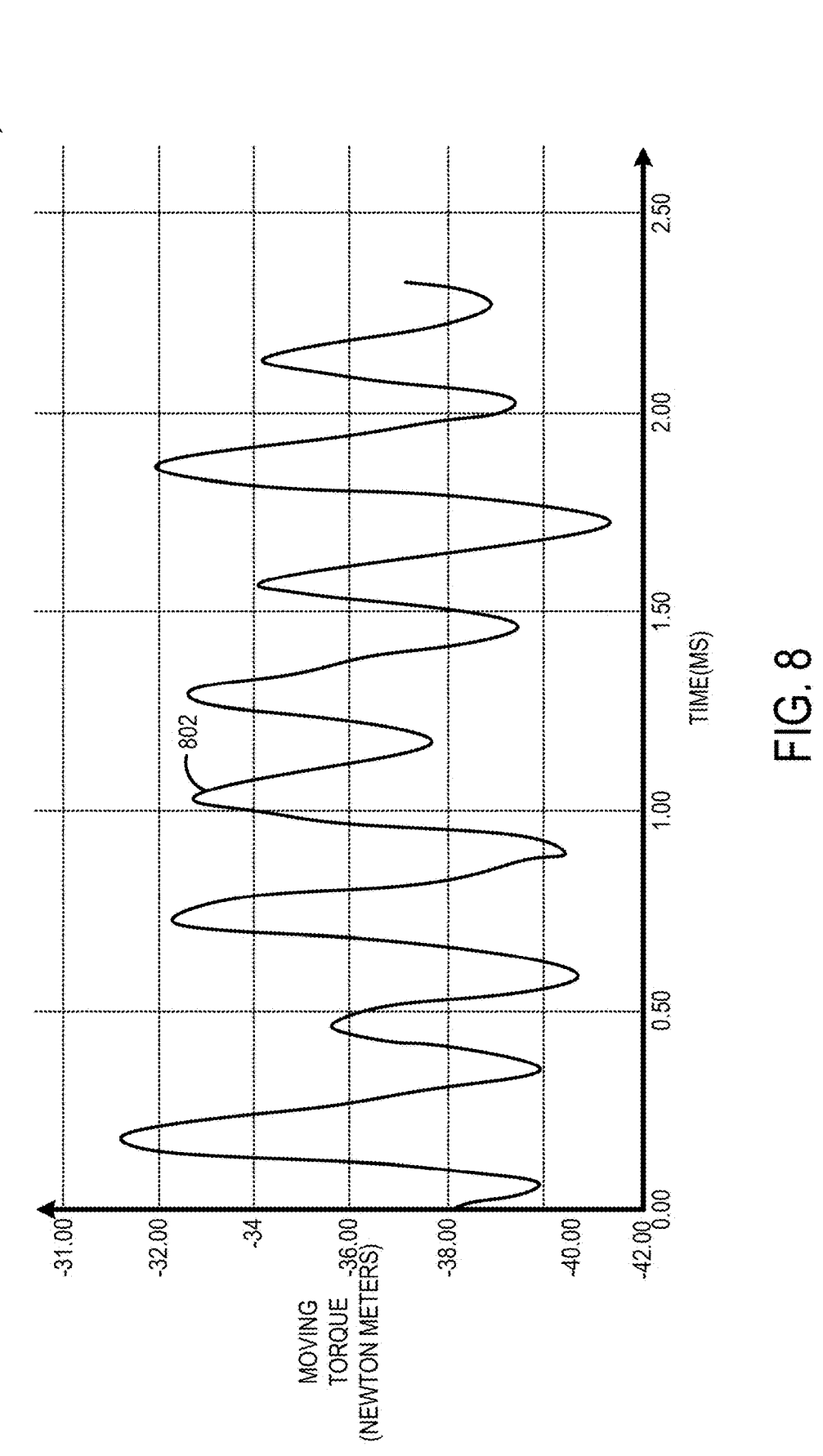

FIG. 6-8 shows graphs of different example waveforms generated during simulated operation of the electric machine 102. For the simulation, the parameters were set as follows:

f1: the frequency of the first stationary winding=100 Hz f2: the frequency of the secondary stationary winding=400 Hz p: the number of pole lobes of the electric machine=6 n: the rotor speed in rpm=−6000 rpm $$fre = \frac{pn}{120} = \frac{(6) - (-6000)}{120} = -300 \text{ Hz}$$

$$f1 = fre + f2 = -300 \text{ Hz} + 400 \text{ Hz} = 100 \text{ Hz}$$

FIG. 6 shows an example graph 600 of voltage induced on the second stationary winding 204 (shown in FIG. 2) during the simulated operation of the electric machine 102. The graph 600 includes three waveforms 602, 604, and 606 that correspond to the three different phases of the induced voltage on the second stationary winding 204 over a quarter of a cycle. Collectively, the three waveforms 602, 604, and 606 produce a voltage that has a frequency of 400 Hz.

FIG. 7 shows an example graph 700 of voltage induced on the first stationary winding 202 (shown in FIG. 2) during the simulated operation of the electric machine 102. The graph 700 includes three waveforms 702, 704, and 706 that correspond to the three different phases of the induced voltage on the first stationary winding 202 over a quarter of a cycle. Collectively, the three waveforms 702, 704, and 706 produce a voltage that has a frequency of 100 Hz.

FIG. 8 shows an example graph 800 of a torque waveform 802 generated by the rotor 206 (shown in FIG. 2) during the simulated operation of the electric machine 102. The torque waveform 802 produces a constant torque of approximately −36 Nm for the specific operating point at −6000 rpm. Note that, in this example, as n changes, the controller 112 of the electric machine 102 changes f1 in order to maintain 400 Hz on f2.

Note that the simulation of the electric machine 102 is provided as one non-limiting example. The electric machine 102 may have different operating characteristics at different operational setpoints.

The electric machine disclosed herein has an architecture that allows the electric machine to generate a plurality of three-dimensional flux paths during operation that each extend transversely across the rotor of the electric machine in radial and axial directions. The flux paths collectively enable the electric machine to generate power at a desired output frequency by adjusting the AC excitation current as the rotor speed changes. In this way, the frequency of the AC output power is decoupled from the rotor speed of the electric machine, which is referred to as being independent speed, variable frequency. Achieving independent speed, variable frequency in this manner allows the electric machine to be directly connected to a drive shaft without requiring a CSD.

Furthermore, since the first and second windings are stationary in the electric machine, the likelihood of the windings becoming degraded during operation of the electric machine is reduced relative to a conventional electric machine that includes rotating electronic components located on a rotor. This increases the reliability of the electric machine relative to a conventional electric machine that includes rotating electronic components located on a rotor. Also, since the first and second windings are stationary in the electric machine, the electrical connections for these windings are less complex relative to electrical connections (e.g., brushes) of a conventional electric machine that includes rotating electronic components located on a rotor.

In this way, the electric machine has increased power density, efficiency, reliability, and reduced cost, weight, and complexity relative to conventional electric machines. The concepts described herein are broadly applicable to numerous applications where generating AC power at a desired frequency that is decoupled from a drive speed is desired.

In one example, an electric machine comprises a stator, a first stationary winding coupled to the stator, a second stationary winding coupled to the stator and including a plurality of winding segments corresponding to a number of phases of power of the electric machine, and a rotor extending through the stator and the second stationary winding, wherein the rotor includes a plurality of rotor segments, wherein each rotor segment of the plurality of rotor segments includes a plurality of pole lobes that extend radially from the rotor segment, and wherein two or more pole lobes of each rotor segment are located on opposing sides of a corresponding winding segment of the second stationary winding. In this example and/or other examples, a number of rotor segments of the rotor may correspond to the number of phases of the electric machine. In this example and/or other examples, each rotor segment of the plurality of rotor segments may have a reference angle that is offset from corresponding reference angles of each of the other rotor segments of the plurality of rotor segments by an offset angle that is based on the number of phases of the electric machine and a number of pole lobes on each rotor segment. In this example and/or other examples, each rotor segment may include one or more pairs of pole lobes, each pole lobe of a pair of pole lobes of the one or more pairs of pole lobes may be located on an opposing side of a corresponding winding segment of the second stationary winding from the other pole lobe of the pair of pole lobes, and each pole lobe of the pair of pole lobes may be offset by 180 degrees of electrical angle relative to the other pole lobe of the pair of pole lobes. In this example and/or other examples, the electric machine may be configured to generate three-phase alternating current (AC) power, the second stationary winding may include three winding segments, the rotor may include three rotor segments, each rotor segment of the three rotor segments may include three pairs of pole lobes, and the reference angle of each rotor segment may be offset by 120 degrees of electrical angle relative to the corresponding reference angles of each of the other rotor segments of the three rotor segments. In this example and/or other examples, the electric machine may further comprise a controller configured to apply an alternating current (AC) excitation current to one of the first stationary winding or the second stationary winding, the AC excitation current may be based at least on a rotation speed of the rotor, the electric machine may generate an AC output power on the other of the first stationary winding or the second stationary winding based at least on the AC excitation current, and the AC output power may have a desired frequency that is independent of the rotation speed of the rotor. In this example and/or other examples, application of the AC excitation current to the second stationary winding may generate a flux path that extends across the rotor transversely in radial and axial directions of the electric machine and travels through a pair of pole lobes of a same rotor segment of the rotor that are located on opposing sides of a corresponding winding segment of the second stationary winding. In this example and/or other examples, the electric machine may be configured to output the AC output power to an AC bus of an aircraft. In this example and/or other examples, the electric machine may be configured to output the AC output power to a propulsion engine of an aircraft. In this example and/or other examples, the rotor may be coupled to a variable speed shaft of an engine of an aircraft.

In another example, an electric machine comprises a stator, a first stationary winding coupled to the stator, a second stationary winding coupled to the stator and including a plurality of winding segments corresponding to a number of phases of power of the electric machine, a rotor extending through the stator and the second stationary winding, wherein the rotor includes a plurality of rotor segments, wherein each rotor segment of the plurality of rotor segments includes a plurality of pole lobes that extend radially from the rotor segment, and wherein two or more pole lobes of each rotor segment are located on opposing sides of a corresponding winding segment of the second stationary winding, and a controller configured to apply an alternating current (AC) excitation current to one of the first stationary winding or the second stationary winding that is based at least on a rotation speed of the rotor such that the electric machine generates an AC output power having a desired frequency that is independent of the rotation speed of the rotor on the other of the first stationary winding or the second stationary winding. In this example and/or other examples, a number of rotor segments of the rotor may correspond to the number of phases of the electric machine. In this example and/or other examples, each rotor segment of the plurality of rotor segments may have a reference angle that is offset from corresponding reference angles of each of the other rotor segments of the plurality of rotor segments by an offset angle that is based on the number of phases of the electric machine and a number of pole lobes on each rotor segment. In this example and/or other examples, each rotor segment may include one or more pairs of pole lobes, each pole lobe of a pair of pole lobes of the one or more pairs of pole lobes may be located on an opposing side of a corresponding winding segment of the second stationary winding from the other pole lobe of the pair of pole lobes, and each pole lobe of the pair of pole lobes may be offset by 180 degrees of electrical angle relative to the other pole lobe of the pair of pole lobes. In this example and/or other examples, the electric machine may be configured to generate three-phase AC power, the second stationary winding may include three winding segments, the rotor may include three rotor segments, each rotor segment of the three rotor segments may include three pairs of pole lobes, and the reference angle of each rotor segment may be offset by 120 degrees of electrical angle relative to reference angles of each of the other rotor segments of the three rotor segments. In this example and/or other examples, application of the AC excitation current to the second stationary winding may generate a flux path that extends across the rotor transversely in radial and axial directions of the electric machine and travels through a pair of pole lobes of a same rotor segment of the rotor that are located on opposing sides of a corresponding winding segment of the second stationary winding. In this example and/or other examples, the electric machine may be configured to output the AC output power to an AC bus of an aircraft. In this example and/or other examples, the electric machine may be configured to output the AC output power to a propulsion engine of an aircraft. In this example and/or other examples, the rotor may be coupled to a variable speed shaft of an engine of an aircraft.

In yet another example, an electric machine comprises a stator, a first stationary winding coupled to the stator, a second stationary winding coupled to the stator and including a plurality of winding segments corresponding to a number of phases of power of the electric machine, and a rotor extending through the stator and the second stationary winding, wherein the rotor includes a plurality of rotor segments, wherein each rotor segment of the plurality of rotor segments includes a plurality of pole lobes that extend radially from the rotor segment, wherein two or more pole lobes of each rotor segment are located on opposing sides of a corresponding winding segment of the second stationary winding; and wherein the electric machine is configured to, based on an AC excitation current being applied to the second stationary winding, generate a flux path that extends across the rotor transversely in radial and axial directions of the electric machine and travels through a pair of pole lobes of a same rotor segment of the rotor that are located on opposing sides of a corresponding winding segment of the second stationary winding.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. An electric machine comprising:
   a stator;
   a first stationary winding coupled to the stator;
   a second stationary winding coupled to the stator and including a plurality of winding segments corresponding to a number of phases of power of the electric machine, wherein the plurality of winding segments are distributed axially along a cylindrical cavity formed by the stator; and
   a rotor extending through the cylindrical cavity formed by the stator and through the second stationary winding, wherein the rotor includes a plurality of rotor segments distributed axially along the cylindrical cavity formed by the stator, wherein each rotor segment of the plurality of rotor segments includes a plurality of pole lobes that extend radially from the rotor segment, and wherein two or more pole lobes of each rotor segment are located on opposing sides of a corresponding winding segment of the second stationary winding.

2. The electric machine of claim 1, wherein a number of rotor segments of the rotor corresponds to the number of phases of the electric machine.

3. The electric machine of claim 1, wherein each rotor segment of the plurality of rotor segments has a reference angle that is offset from corresponding reference angles of each of the other rotor segments of the plurality of rotor segments by an offset angle that is based on the number of phases of the electric machine and a number of pole lobes on each rotor segment.

4. The electric machine of claim 3, wherein each rotor segment includes one or more pairs of pole lobes, wherein each pole lobe of a pair of pole lobes of the one or more pairs of pole lobes is located on an opposing side of a corresponding winding segment of the second stationary winding from the other pole lobe of the pair of pole lobes, and wherein each pole lobe of the pair of pole lobes is offset by 180 degrees of electrical angle relative to the other pole lobe of the pair of pole lobes.

5. The electric machine of claim 4, wherein the electric machine is configured to generate three-phase alternating current (AC) power, wherein the second stationary winding includes three winding segments, wherein the rotor includes three rotor segments, wherein each rotor segment of the three rotor segments includes three pairs of pole lobes, and wherein the reference angle of each rotor segment is offset by 120 degrees of electrical angle relative to the corresponding reference angles of each of the other rotor segments of the three rotor segments.

6. The electric machine of claim 1, further comprising:

a controller configured to apply an alternating current (AC) excitation current to one of the first stationary winding or the second stationary winding, wherein the AC excitation current is based at least on a rotation speed of the rotor, wherein the electric machine generates an AC output power on the other of the first stationary winding or the second stationary winding based at least on the AC excitation current, and wherein the AC output power has a desired frequency that is independent of the rotation speed of the rotor.

7. The electric machine of claim 6, wherein application of the AC excitation current to the second stationary winding generates a flux path that extends across the rotor transversely in radial and axial directions of the electric machine and travels through a pair of pole lobes of a same rotor segment of the rotor that are located on opposing sides of a corresponding winding segment of the second stationary winding.

8. The electric machine of claim 6, wherein the electric machine is configured to output the AC output power to an AC bus of an aircraft.

9. The electric machine of claim 6, wherein the electric machine is configured to output the AC output power to a propulsion engine of an aircraft.

10. The electric machine of claim 1, wherein the rotor is coupled to a variable speed shaft of an engine of an aircraft.

11. An electric machine comprising:

a stator;

a first stationary winding coupled to the stator;

a second stationary winding coupled to the stator and including a plurality of winding segments corresponding to a number of phases of power of the electric machine, wherein the plurality of winding segments are distributed axially along a cylindrical cavity formed by the stator;

a rotor extending through the cylindrical cavity formed by the stator and through the second stationary winding, wherein the rotor includes a plurality of rotor segments distributed axially along the cylindrical cavity formed by the stator, wherein each rotor segment of the plurality of rotor segments includes a plurality of pole lobes that extend radially from the rotor segment, and wherein two or more pole lobes of each rotor segment are located on opposing sides of a corresponding winding segment of the second stationary winding; and a controller configured to apply an alternating current (AC) excitation current to one of the first stationary winding or the second stationary winding that is based at least on a rotation speed of the rotor such that the electric machine generates an AC output power having a desired frequency that is independent of the rotation speed of the rotor on the other of the first stationary winding or the second stationary winding.

12. The electric machine of claim 11, wherein a number of rotor segments of the rotor corresponds to the number of phases of the electric machine.

13. The electric machine of claim 11, wherein each rotor segment of the plurality of rotor segments has a reference angle that is offset from corresponding reference angles of each of the other rotor segments of the plurality of rotor segments by an offset angle that is based on the number of phases of the electric machine and a number of pole lobes on each rotor segment.

14. The electric machine of claim 13, wherein each rotor segment includes one or more pairs of pole lobes, wherein each pole lobe of a pair of pole lobes of the one or more pairs of pole lobes is located on an opposing side of a corresponding winding segment of the second stationary winding from the other pole lobe of the pair of pole lobes, and wherein each pole lobe of the pair of pole lobes is offset by 180 degrees of electrical angle relative to the other pole lobe of the pair of pole lobes.

15. The electric machine of claim 14, wherein the electric machine is configured to generate three-phase AC power, wherein the second stationary winding includes three winding segments, wherein the rotor includes three rotor segments, wherein each rotor segment of the three rotor segments includes three pairs of pole lobes, and wherein the reference angle of each rotor segment is offset by 120 degrees of electrical angle relative to reference angles of each of the other rotor segments of the three rotor segments.

16. The electric machine of claim 11, wherein application of the AC excitation current to the second stationary winding generates a flux path that extends across the rotor transversely in radial and axial directions of the electric machine and travels through a pair of pole lobes of a same rotor segment of the rotor that are located on opposing sides of a corresponding winding segment of the second stationary winding.

17. The electric machine of claim 11, wherein the electric machine is configured to output the AC output power to an AC bus of an aircraft.

18. The electric machine of claim 11, wherein the electric machine is configured to output the AC output power to a propulsion engine of an aircraft.

19. The electric machine of claim 11, wherein the rotor is coupled to a variable speed shaft of an engine of an aircraft.

20. An electric machine comprising:

a stator;

a first stationary winding coupled to the stator;

a second stationary winding coupled to the stator and including a plurality of winding segments corresponding to a number of phases of power of the electric machine, wherein the plurality of winding segments are distributed axially along a cylindrical cavity formed by the stator; and a rotor extending through the cylindrical cavity formed by the stator and through the second stationary winding, wherein the rotor includes a plurality of rotor segments, wherein each rotor segment of the plurality of rotor segments includes a plurality of pole lobes that extend radially from the rotor segment distributed axially along the cylindrical cavity formed by the stator, wherein two or more pole lobes of each rotor segment are located on opposing sides of a corresponding winding segment of the second stationary winding; and wherein the electric machine is configured to, based on an AC excitation current being applied to the second stationary winding, generate a flux path that extends across the rotor transversely in radial and axial directions of the electric machine and travels through a pair of pole lobes of a same rotor segment of the rotor that are located on opposing sides of a corresponding winding segment of the second stationary winding.

\* \* \* \* \*